United States Patent [19]

Hasl

[11] Patent Number: 4,838,776

[45] Date of Patent: Jun. 13, 1989

[54] LABEL TRANSFERRING APPARATUS FOR BLOW MOLDING MACHINES

[76] Inventor: Siegfried C. Hasl, 80 Liberty Corner, Warren, N.J. 07060

[21] Appl. No.: 524,193

[22] Filed: Aug. 18, 1983

[51] Int. Cl.⁴ ............................................. B31B 1/12
[52] U.S. Cl. ................................. 425/112; 156/569; 264/509; 425/116; 425/117; 425/127; 425/517; 425/126.1; 425/129.1
[58] Field of Search .................... 156/539, 556–557, 156/566, 569, 570, 572, DIG. 31; 271/90, 93, 95, 99, 102, 131, 132; 414/125, 128; 264/509; 425/110, 112, 116–117, 126 R, 127, 129 R, 506, 514, 517

[56] References Cited

U.S. PATENT DOCUMENTS

| | | | |
|---|---|---|---|
| 1,157,660 | 10/1915 | Coates | 156/483 |
| 1,165,936 | 12/1915 | Becker | 156/560 |
| 1,282,700 | 10/1918 | Knapp | 156/DIG. 8 |
| 1,445,745 | 2/1923 | Burke | 264/247 |
| 1,551,847 | 9/1925 | Riley | 156/81 |
| 1,744,438 | 1/1930 | Benson | 264/326 |
| 2,106,864 | 2/1938 | Balton | 156/DIG. 8 |
| 2,601,700 | 7/1952 | Pinsky | 264/150 |
| 2,767,873 | 10/1956 | Whitecar | 156/481 |
| 2,864,522 | 12/1958 | Tuthill | 156/493 |
| 3,072,969 | 1/1963 | DuBois | 425/528 |
| 3,108,850 | 10/1963 | Brandt | 425/526 |
| 3,151,193 | 9/1964 | Thornton | 264/509 |
| 3,194,857 | 7/1965 | White | 264/509 |
| 3,207,822 | 9/1965 | Makowski | 425/533 |
| 3,227,787 | 1/1966 | Battenfeld | 264/509 |
| 3,267,186 | 8/1966 | Battenfeld | 264/509 |
| 3,272,681 | 9/1966 | Langecker | 264/509 |
| 3,287,198 | 11/1966 | Battenfeld | 264/509 |
| 3,292,209 | 12/1966 | Borkmann | 425/126 R |
| 3,324,508 | 6/1967 | Dickinson et al. | |
| 3,380,121 | 4/1968 | Chittenden | 264/509 |
| 3,417,175 | 12/1968 | Brown | 264/509 |
| 3,434,902 | 3/1969 | Bliss | 156/230 |
| 3,438,085 | 4/1969 | Larkin | 264/509 |
| 3,474,498 | 10/1969 | Hoppes | 264/509 |
| 3,503,826 | 3/1970 | Nasica | 156/309.9 |
| 3,510,341 | 5/1970 | Peck | 156/80 |
| 3,518,335 | 6/1970 | Jablonski | 425/44 |
| 3,550,197 | 12/1970 | Szajna | 264/509 |
| 3,559,248 | 2/1971 | Stockmann | 425/504 |
| 3,608,020 | 9/1971 | Langecker | 264/509 |
| 3,632,252 | 1/1972 | Amberg | 264/509 |
| 3,657,405 | 4/1972 | Langecker | 264/509 |
| 3,770,860 | 11/1973 | Amberg | 264/509 |
| 3,801,689 | 4/1974 | Langecker | 156/261 |
| 4,035,222 | 7/1977 | Amberg | 411/33 |
| 4,163,686 | 11/1979 | Risi | 156/492 |
| 4,233,262 | 11/1980 | Curto | 264/509 |
| 4,287,150 | 9/1981 | Gendron | 264/509 |
| 4,289,817 | 9/1981 | Valyi | 264/509 |
| 4,306,926 | 12/1981 | Pfulb | 156/215 |
| 4,307,058 | 12/1981 | Morello | 264/132 |
| 4,323,411 | 4/1982 | Uhlig | 264/509 |
| 4,335,635 | 6/1982 | Hautemons | 264/509 |
| 4,339,409 | 7/1982 | Curto | 264/509 |
| 4,355,967 | 10/1982 | Hellmer | 425/503 |
| 4,359,314 | 11/1982 | Hellmer | 425/503 |
| 4,397,625 | 8/1983 | Hellmer et al. | |

Primary Examiner—Merrell C. Cashion, Jr.
Attorney, Agent, or Firm—Larson and Taylor

[57] ABSTRACT

A label transferring device which places labels simultaneously in separate sides of a mold used in blow molding machines. A hydraulic cylinder has a carriage assembly mounted to the piston rod so as to be extended between the separated mold sections and retracted to a position between a set of label supply magazines. The label supply magazines are positioned so that a set of opposed carrying cylinders can extend and pick up the labels on carrying heads and place the labels on the placement areas in the mold. Alternatively, the carrying cylinders are mounted on a pair of extendable, converging clamp arms which clamp onto the molded objects, remove them from the molding area and transport the objects to other processing stations in the machine.

6 Claims, 8 Drawing Sheets

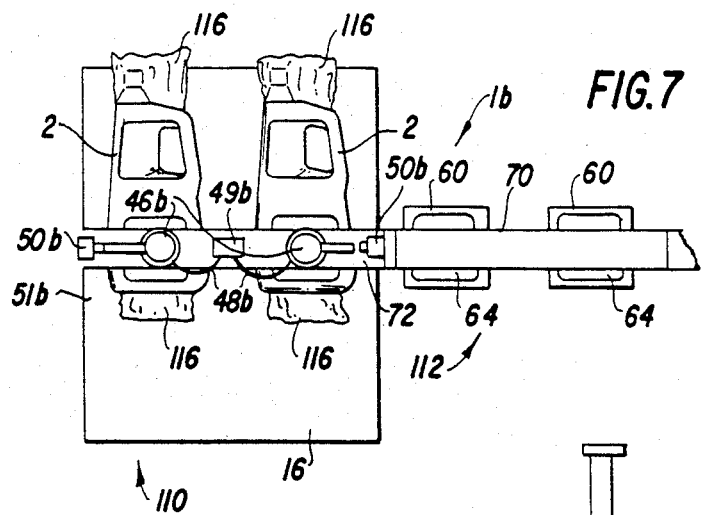
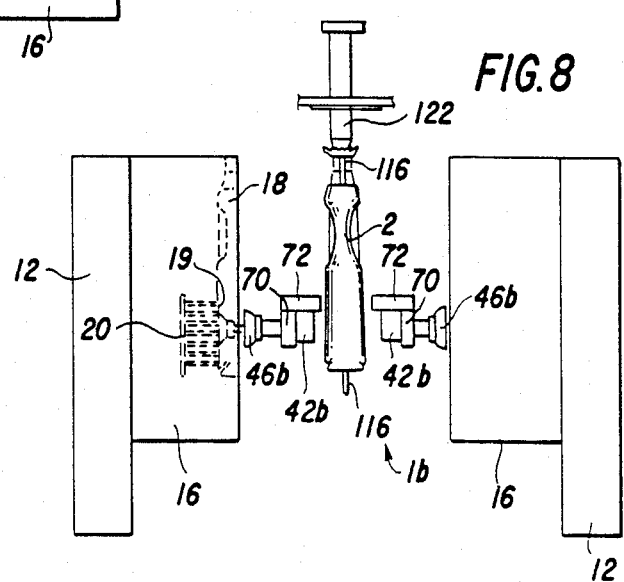

LABEL TRANSFERRING APPARATUS FOR BLOW MOLDING MACHINES

This application is a division of U.S. application Ser. No. 515,032, filed July 18, 1983, now abandoned.

BACKGROUND OF THE INVENTION

The present invention relates to in-mold labeling devices and in particular to label transferring devices which are used in blow molding machines having separable molds carried on a pair of platens.

Blow molding machines having various designs are well known in the art. Many of these blow molding machines utilize a pair of spaced, movable platens which have mating mold sections mounted on their facing surfaces. These machines may utilize a single work station at which a parison of molding material is extruded or otherwise formed and then clamped between the mold sections. The object to be molded, such as a bottle or the like, undergoes the blow molding process at that station, after which the mold sections separate and the bottle is released. Other machines known as wheel types, utilize several work stations and the platens are movable between the different work stations so that the machine can service several molds at the same time.

It is desirable in blow molding containers to in-mold labels. This process consists of placing the container labels within the mold cavity prior to the blow molding process. The label is thus attached to the bottle during the molding process and proper placement and adhesion are assured.

One difficulty experienced with such in-mold label application is that label transfer time must be kept at a minimum in order to reduce the amount of time that the mold sections must remain open. Any delay in the closing of the mold sections increases the cycle time for the blow molding process and thus reduces the productivity of the machine.

Heretofore, various methods of placing labels into separable molds have been utilized. These have included the use of a lable carrying arm which extends between the separated mold sections when they are open, and the use of a special label insert aperture in the mold through which the label is punched into position. The present invention is an improvement to the former type of method, the present state of the art being illustrated, for example, by U.S. Pat. Nos. 3,072,969, issued Jan. 15, 1963; 3,292,209, issued Dec. 20, 1966; and 4,355,967, issued Oct. 26, 1982.

Additionally, manufacturing costs are increased for the handling of blow molded objects when they are not properly oriented upon removal from the blow molding machine. Separate handling machines are required to sort and properly orient the objects so they can be used. Such additional procedures are costly and time consuming.

SUMMARY OF THE INVENTION

The present invention is embodied in a label transferring device which is used to place labels in the mold of a blow molding machine. The mold has separable sections which are carried on converging platens which are supported on a machine frame. A label carrying head includes a means for holding onto the labels, but which also permits the labels to be removed from the carrying head when required. Mounted on the machine frame is a reciprocating extender assembly which includes an extendable element which may be shifted only in a straight line along a longitudinal axis. The means which shifts the extendable element shifts the extendable element between a withdrawn position away from the platens and an extended position between the mold sections. The label carrying head is supported on the extender assembly by a means which shifts the head into a mold section when the extender assembly is extended. The label carrying head is supplied with labels from a means mounted on the machine frame when the extender assembly is withdrawn.

The label carrying heads preferably are mounted on a pair of clamping arms which extend between the mold sections. The clamping arms remove the blow molded objects and transport them to other processing stations in the blow molding machine while the label carrying heads place the labels in the mold sections.

The present invention allows for the rapid placement of labels within mold sections since the carriage assembly or clamping arms are only required to be moved linearly between the label supply and the mold sections. The smaller carrying heads can then be rapidly employed due to their small size and comparably small mass. Due to the one-dimensional movement of the carriage assembly, complex mechanisms which would result in complicated and time-consuming motion are not required. The device produces a compact design which can be mounted directly to existing machines rather than requiring a free-standing support or otherwise requiring a large amount of operating room. The uncomplicated straight-line movements of the respective elements permit easy assembly and installation upon a machine while maintaining proper alignment with the mold sections.

The clamping arms with mounted carrying heads additionally result in bottles which are removed from the blow molding machine in their proper orientation. Additional handling steps are not required to properly orient the bottles, so the bottles may be immediately transported to a bottle filling station for use. This results in a substantial savings in cost of manufacture and time.

Further, bottles after removal from the mold require a cooling period prior to having the excess flash removed from the bottom and top ends. The present invention makes beneficial use of the delay of the clamping arms at the cooling station, since the carrying heads on the clamping arms pick up a new set of labels at that station. Thus, the present invention makes effective use of a previously relatively idle portion of the blow molding machine.

These and many other aspects and objects of the invention will be recognized by those skilled in the art from the description, claims and drawings which follow.

BRIEF DESCRIPTION OF THE DRAWINGS

FIG. 7 is a fragmentary view of the device as positioned in FIG. 6 taken along plane VII—VII, showing a pair of clamp arms extended around a set of blow molded bottles;

FIG. 8 is a view of the device taken along plane VIII—VIII of FIG. 6, shown with the label transfer device having already placed the labels in the mold and a blow pin holding the bottle.

DETAILED DESCRIPTION OF THE PREFERRED EMBODIMENTS

Figure 1:
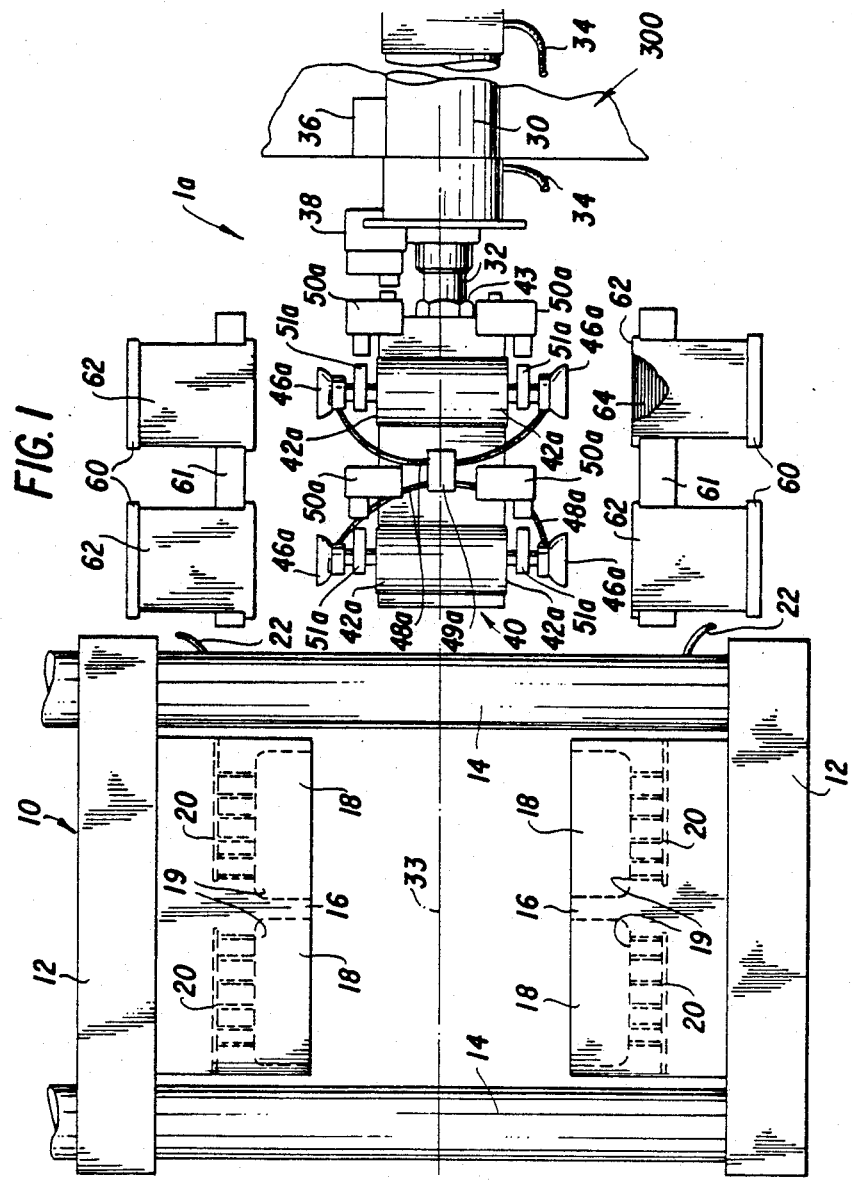
FIG. 1 is a fragmentary plan view of a label transferring device and a pair of platens with mold sections mounted thereon in a separated position showing a preferred embodiment of the invention.
Figure 2:
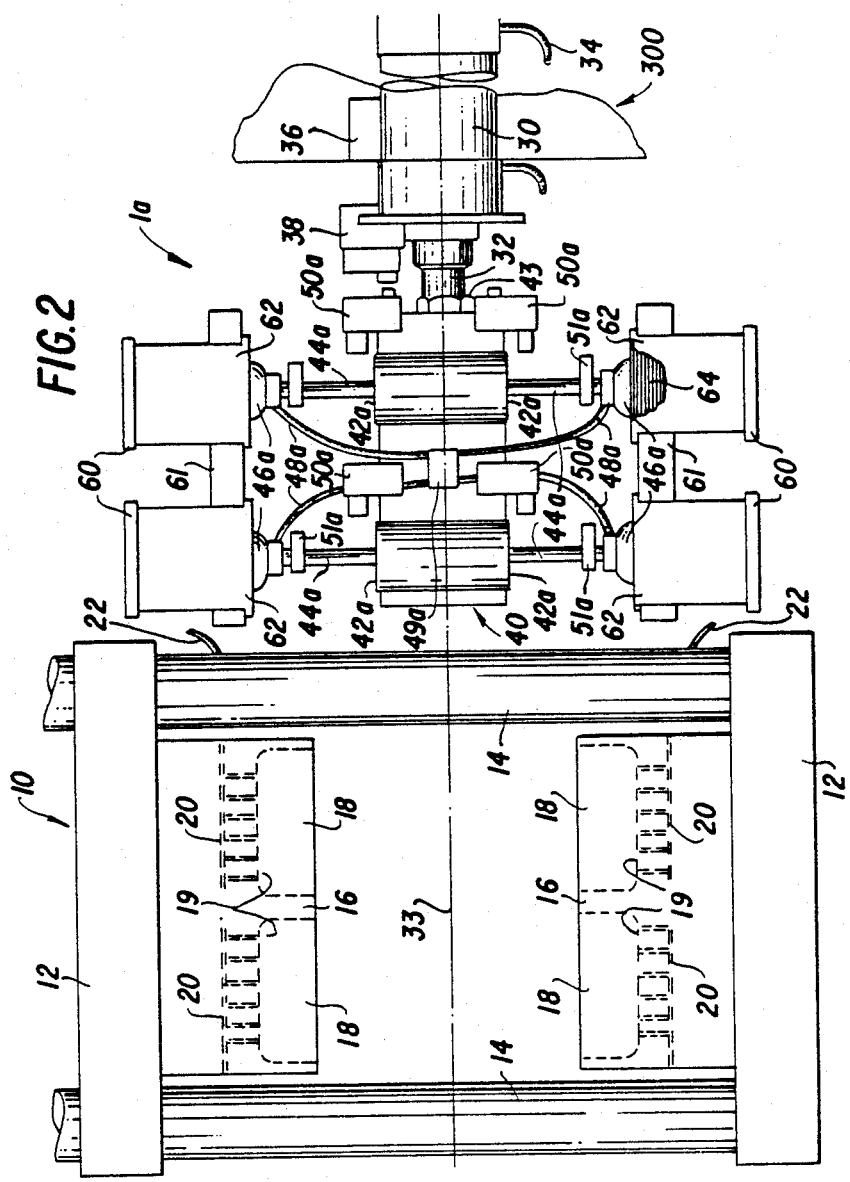
FIG. 2 is a fragmentary plan view of the device of FIG. 1, shown with the label carrying heads fully extended to pick up a set of labels.
Figure 3:
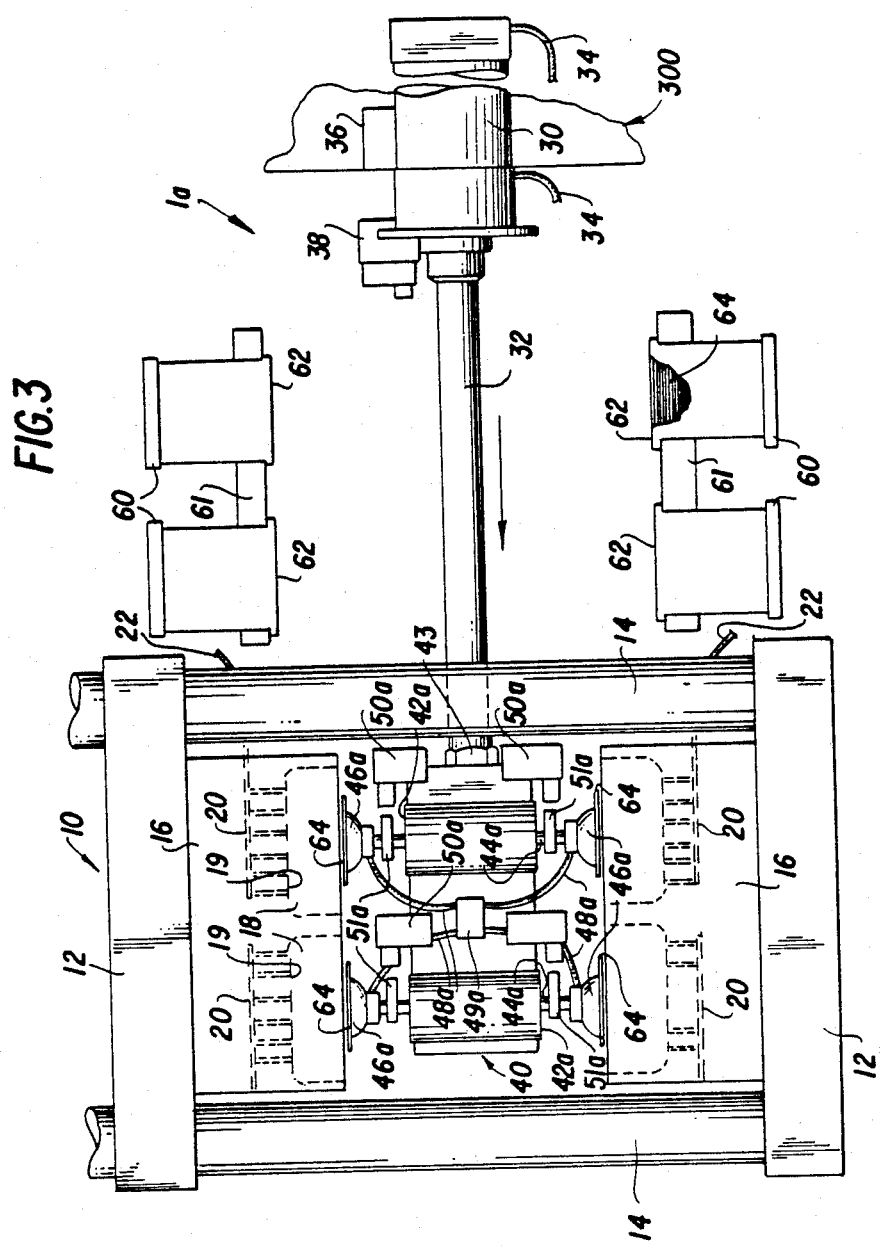
FIG. 3 is a fragmentary plan view of the device of FIG. 1, shown with the carriage assembly extended between the separated mold sections and the label carrying heads fully retracted each with a label carried thereon.
Figure 4:
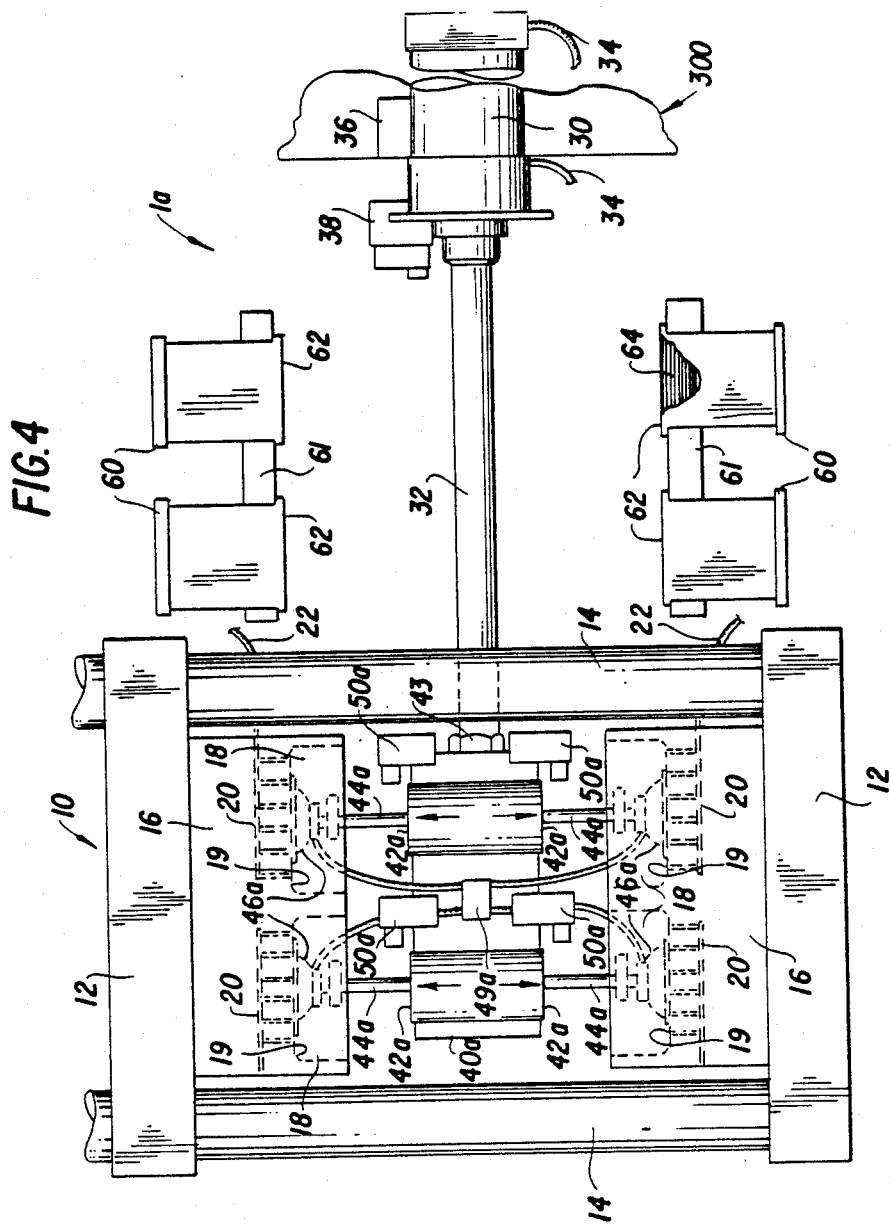
FIG. 4 is a fragmentary plan view of the device of FIG. 3, shown with the label carrying heads fully extended placing the labels within the separated mold sections.
Figure 5:
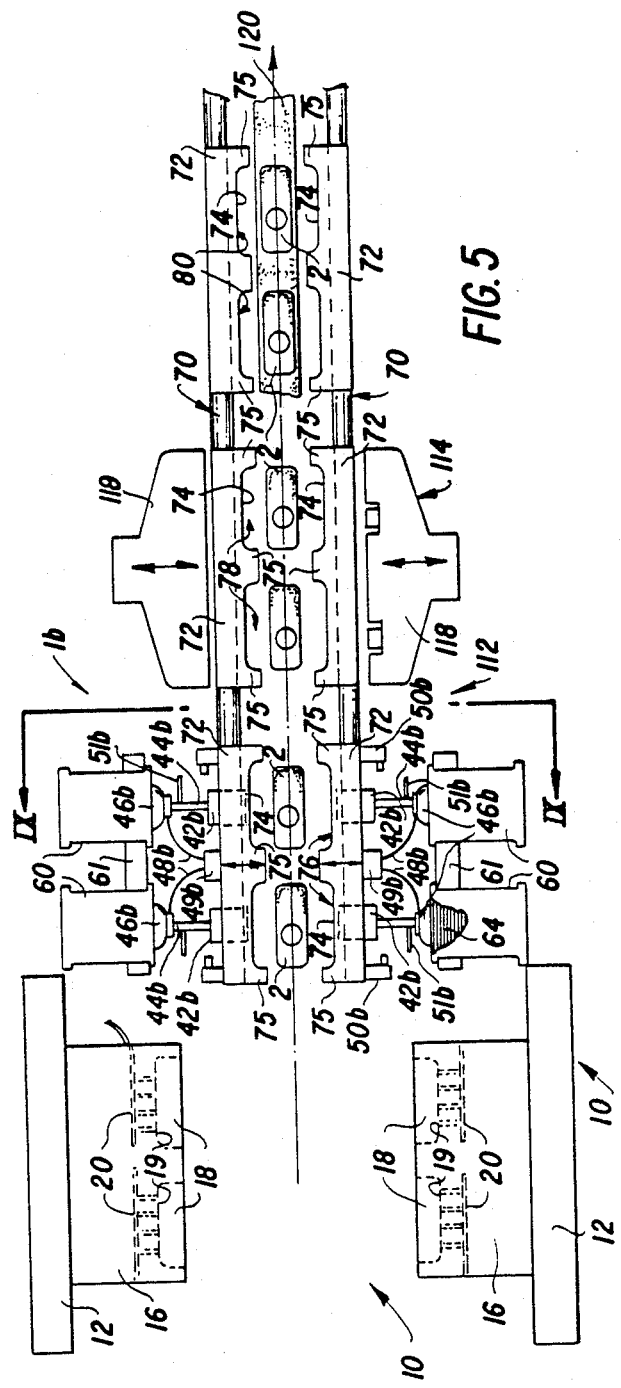
FIG. 5 is a fragmentary plan view of a second preferred embodiment of the invention, showing a label transferring device mounted on a pair of bottle removal arms with the arms retracted.
Figure 6:
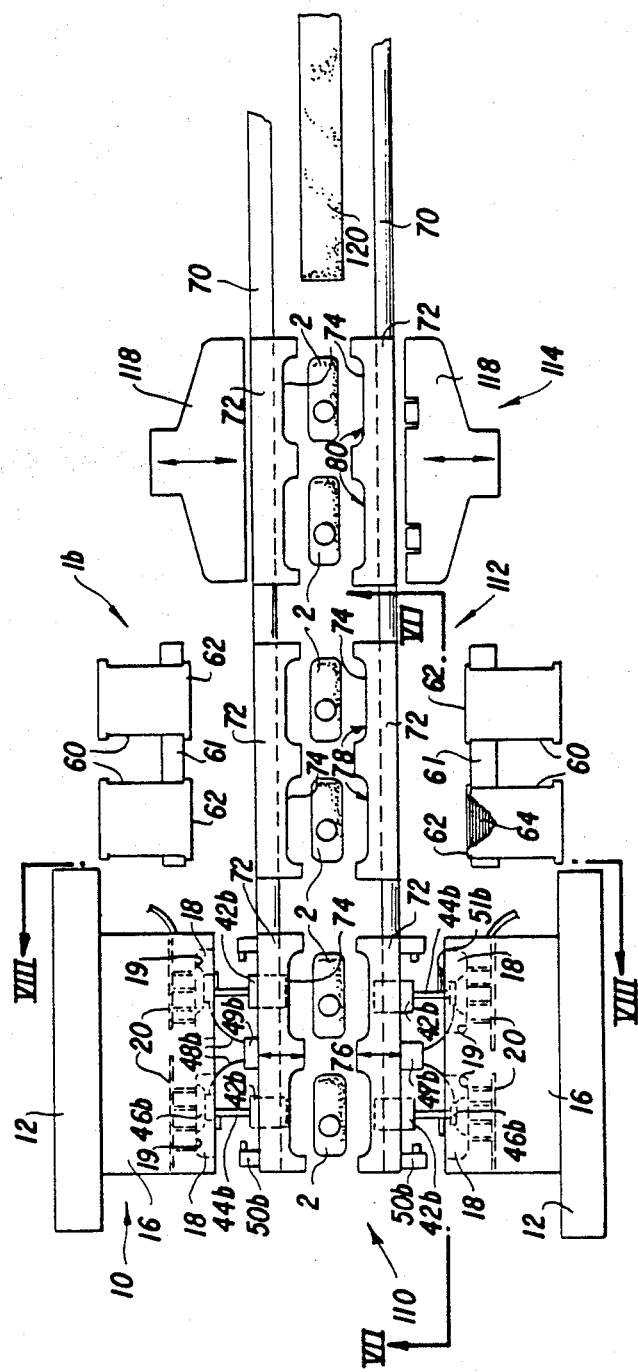
FIG. 6 is a fragmentary plan view of the device of FIG. 5, shown with the clamp arms extended and the transferring device placing a set of labels in the mold sections.

In the two preferred embodiments shown in FIGS. 1 and 5, a label transferring device 1 has either a carriage 40, FIG. 1, or a pair of arms 70, FIG. 5, which are slidably mounted so as to be extended from their at-rest position between a set of label supply magazines 60, FIGS. 1, 5, to a position between a pair of mold sections 16 mounted in a blow molding machine, FIGS. 3, 6. Carried on carriage 40 and arms 70 are a set of opposed label carrying vacuum heads 46 which can be extended from the sides of carriage 40 or arms 70 in order to pick up a new set of labels, FIGS. 2, 5, and to apply these labels to both mold sections 16 simultaneously, FIGS. 4, 6. Since transferring device 1 has a label supply 60 which is linearly aligned with the mold sections 16, carriage 40 and arms 70 are only required to reciprocate back and forth between the label pick-up and label applying stations, thereby reducing other extraneous movements and reducing the time required for a single labeling cycle. In the embodiment of FIG. 5, clamp arms 70 are additionally used to withdraw the blown bottles from between the mold sections 16 to transport the bottles to other processing stations in the machine.

EMBODIMENT OF FIGS. 1–4

Transferring device 1a, as shown in FIGS. 1–4, is used with a molding assembly 10 which has a pair of spaced, movable platens 12 which are slidably mounted on a set of tie rods 14, FIGS. 1–4. Platens 12 slide on tie rods 14 in order to converge and separate mold sections 16 mounted on facing surfaces thereof. Plattens 12 may also be mounted within the blow molding machine to move from one blow molding station to another during the molding process—i.e., from an extrusion station where the mold sections are closed on the parisons to a calibration station where blowing of the parisons is effected. This allows the use of multiple molds with a single extrusion station.

Mold sections 16 each include a pair of mold cavities 18 which are configured to mate with the opposing mold cavity 18 and shape the blown object during the blow molding process. Running through platens 10 are cooling manifolds (not shown) which communicate with a mating network of cooling ducts located in mold sections 16 (not shown), as is conventionally known in the art. Within each mold cavity 18 is a label mounting surface 19 on which the label is placed in order to be properly aligned on the finished bottle. Label mounting surfaces 19 are underlaid by a network of vacuum channels 20 which extend through label mounting surfaces 19 and hold the label in place during the molding process. Vacuum channels 20 are negatively pressurized by a flexible vacuum supply hose 22 which extends to a suitable vacuum source of any conventional type.

Carriage 40, FIGS. 1–4, is mounted on a positioning hydraulic cylinder 30 which includes a main rod in the form of a nonrotating piston rod 32 which extends carriage 40 in cantilever fashion, FIGS. 3, 4. Positioning hydraulic cylinder 30 is mounted on the blow molding machine frame 300. Hydraulic cylinder 30 is oriented to extend piston rod 32 in horizontal registry with magazines 60 and label mounting surfaces 19. It is also directed along the plane in which part line 33 lies, part line 33 being the line at which the mating faces of mold sections 16 abut when the mold is closed.

Piston rod 32 is sufficiently long so as to position carriage 40 between mold sections 16 when hydraulic cylinder 30 is extended, FIG. 3. Cylinder 30 is a double-acting oil cylinder which is controlled by a suitable oil pressure supply 34, such as through flexible hoses or the like. Mounted on hydraulic cylinders 30 is a full-out limit switch 36 which is contacted when piston rod 32 is fully extended and, thus, when vacuum heads 46 are in longitudinal registry with label locations 19 in cavities 18. Mounted on the mold facing side of cylinder 30 is a full-in limit switch 38 which senses when carriage 40 has been fully withdrawn from between mold sections 16, FIGS. 1–2, and, thus, when vacuum heads 46 are in longitudinal registry with label magazines 60. Limit switches 36 and 38 are used in the control of label transferring device 1a as is described below.

As shown in FIGS. 1–4, carriage 40 has an overall rectangular shape on which two sets of placement hydraulic cylinders 42a are mounted in opposition. Carriage 40 is coupled to piston rod 32 by conventional means, such as a threaded coupling or union 43. Placement cylinders 42a each have a rod 44a and are mounted to extend a vacuum head 46a mounted on rod 44a away from the side of carriage 40, FIGS. 2, 4. Two vacuum heads 46a are mounted on either side of carriage 40 and are aligned generally parallel to the line of movement of positioning cylinder rod 32. The pair of vacuum heads 46a on each side are spaced approximately equal to the spacing between the two label mounting surfaces 19 on each mold so that vacuum heads 46a may simultaneously place a label on mounting surfaces 19. So mounted, each vacuum head 46a operates in opposition to another head 46a.

Each vacuum head 46a is supplied a vacuum across its flexible cup-shaped outer face by flexible vacuum supply hoses 48a which all join a common vacuum supply manifold 49a. Manifold 49a is supplied vacuum by suitable means, such as a flexible hose connected to a suitable vacuum source.

Mounted on carriage 40 are four full-in limit switches 50a, each of which is tripped by a lobe 51a on rod 44a when hydraulic cylinder 42a is fully retracted, FIG. 1.

Limit switches 50a are utilized in the control of the label transferring device described infra.

Mounted to the blow molding machine frame are four label magazines 60, FIGS. 1-4. Two label magazines 60 are suitably mounted on each of a pair of support bars 61 in any conventional manner located on opposite sides of carriage 40 when in a retracted position, FIGS. 1-2. Magazines 60 are mounted so as to be longitudinally aligned with placement hydraulic cylinders 42a when positioning cylinder 30 is retracted, FIG. 1, so that vacuum heads 46a will be extended toward and contact the open ends of label magazines 60 as placement cylinders 42a are activated.

Label magazines 60 have an open end 62 through which a supply of labels 64 are accessible by vacuum heads 46. Labels 64 are stacked in magazine 60 and are urged toward open end 62 by a spring. The labels are retained within magazine 60 by an annular flange or lip at open end 62. Open ends 62 are aligned generally in the same vertical plane as label mounting surfaces 19 on the open mold sections 16. Both label magazine open ends 62 and label mounting surfaces 19, thus, are spaced approximately the same distance from the path of travel of carriage 40. Both magazines 60 and mounting surfaces 19 may be accessed by vacuum heads 46a when rods 44a are fully extended.

OPERATION

In operation, label transferring device 1a will simultaneously place labels 64 in the four mold cavities 18. It will then retract, pick up four more labels and place them in the cavities once the blowing operation has been completed.

At the beginning of the cycle, carriage 40 is retracted from platens 12 and placement cylinders 42a are retracted, as shown in FIG. 1. Mold sections 16 may be separated, as shown in FIGS. 1-2, or may be closed and undergoing the blowing process for bottles from the previous cycle. When carriage rod 40 is fully retracted, limit switch 38 activates hydraulic cylinders 42a which extend rods 44a and vacuum heads 46a until they contact label magazine open ends 62 as shown in FIG. 2. A vacuum is continuously supplied across the cup faces of vacuum heads 46a to secure labels 64 to heads 46a. Placement cylinders 42a are extended for a timed duration and then retracted, with vacuum heads 46a removing the outermost labels 64 from label magazines 60, as is well known in the art.

With mold sections 16 separated, when limit switches 50a sense that vacuum heads 46a have been retracted, positioning cylinder 30 is activated and piston rod 32 is extended to move carriage 40 between mold sections 16, FIG. 3. Vacuum heads 46a with the attached labels 64 are thus brought into lateral alignment with label mounting surfaces 19. When piston rod 32 is fully extended, limit switch 36 activates placement cylinders 42a to extend rods 44a as shown in FIG. 4. Vacuum heads 46a press labels 64 against the label mounting surfaces 19, where they adhere due to a vacuum which is constantly supplied through channels 20.

Placement cylinders 42a extend vacuum heads 46a for a timed duration, after which vacuum heads 46a are withdrawn. The vacuum supplied to vacuum channels 20a underlying label mounting surfaces 19 is greater than the vacuum at vacuum heads 46a, so that as heads 46a retract, labels 64 are removed from heads 46a and adhere in proper registry to mounting surfaces 19. When heads 46a have fully retracted, limit switches 50a activate positioning hydraulic cylinder 30 to retract piston rod 32 and carriage 40, FIG. 1. Limit switch 38 will activate placement cylinders 42 for the start of a new cycle. At this or during the same time, mold sections 16 can be transferred and/or converged by platens 12 to converge around the parisons.

EMBODIMENT OF FIGS. 5-9

As shown in FIGS. 5-9, a label transferring device 1b is used to transfer labels into the mold sections 16, and to remove the set of bottles 2 which are the result of the previous blowing cycle from between mold sections 16. Label transferring device 1b is particularly suited to blow molding machines in which bottle removal between the bottoms of platens 12 is prevented, such as in blow molding machines which utilize platens which are pivotally moved between various processing stations in the blow molding machine. These platens include tie rods located beneath mold sections 16 which prevent the bottles from being ejected downwardly.

As shown in FIGS. 5, 6, molding assembly 10 has a pair of spaced, movable platens 12 which carry a mating pair of mold sections 16. Mold sections 16 have a pair of mold cavities 18 with label mounting surfaces 19 which are underlaid by vacuum channels 20 as described in connection with the previous embodiment.

A pair of a elongated bottle clamping arms 70 are used to walk bottles 2 from between mold sections 16. As shown in FIGS. 5 and 6, arms 70 each have three clamp elements 72 which are grouped in opposing pairs on the two arms 70. Each clamp element has a concave, bottle-conforming surface 74 bounded by inwardly converging flanges 75 which form a pair of bottle clamping seats. The finished containers are walked by clamps 76 from the calibration station 110 to the label supply station 112; by clamps 78 from the label supply station to the deflashing station 114; and by clamps 80 onto conveyor 120.

Figure 9:
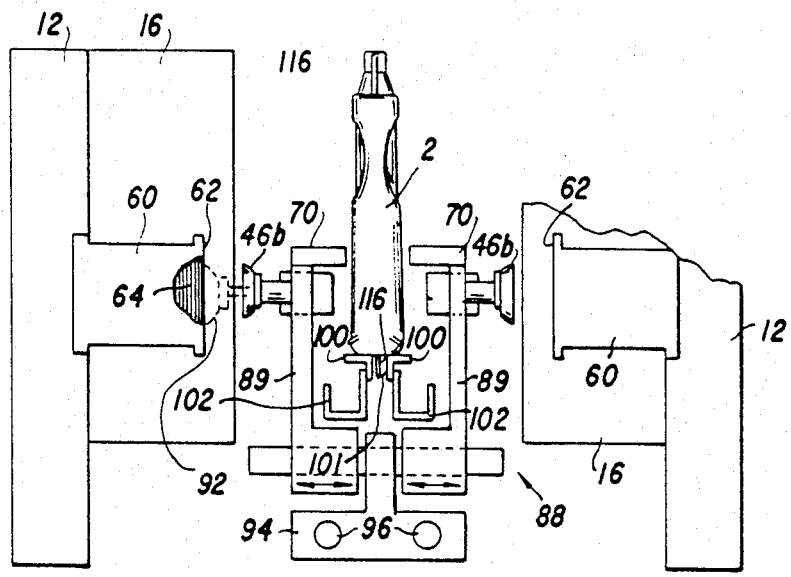
FIG. 9 is a fragmentary view of the device taken along plane IX—IX of FIG. 5, shown with the label transfer device prior to picking up a new supply of labels.

Clamping arms 70 are converged, retracted and reciprocated by assembly 88, FIG. 9. A spaced pair of vertical support arms 89 rigidly depend from arms 70. Support arms 89 are slidably mounted to a pair of horizontal, laterally directed slide rods 92 upon which arms 89 are converged and retracted to clamp onto and release bottles 2 as is conventionally known in the art. Carriage elements 94 support slide rods 92, arms 70 and 89. Elements 94 are mounted for longitudinal sliding movement on rods 96 in a conventional manner. Lateral and longitudinal motion is imparted to the arms 70, typically, by hydraulic cylinders.

Extending parallel to and below clamping arms 70 between support arms 89 is a pair of support brackets 100 which form a support stand for bottles 2 when clamp arms 70 are released. Brackets 100 are spaced to provide a slot 101 which accommodates flash 116 located on the bottom of the bottle. Brackets 100 are each mounted to the blow molding machine by a mounting bracket 102.

Mounted on each clamping arm 70 opposite clamps 76 and facing outwardly are a pair of placement hydraulic cylinders 42b, FIGS. 5-6. Cylinders 42b have extending rods 44b with vacuum heads 46b carried thereby, as described in relation to the embodiment of FIGS. 1-4. Vacuum heads 46b are provided with a vacuum across their flexible, cup-shaped outer surface by vacuum supply hoses 48b which are coupled to a vacuum supply manifold 49b on each clamp arm 70.

Limit switches 50b are tripped by lobes 51b on rods 44b when cylinders 42b are retracted.

Placement cylinders 42b are positioned on each clamping arm 70 such that the longitudinal spacing therebetween corresponds to the longitudinal spacing between label mounting surfaces 19 of mold cavities 18 and label magazines 60. Placement cylinders 42b extend from clamp arms 70 to contact and place labels on label mounting surfaces 19 in both mold sections 16 simultaneously when arms 70 are extended between mold sections 16.

At label station 112 are mounted four label magazines 60 which provide vacuum heads 46b with labels 64 as described in relation to the embodiment of FIGS. 1-4. Label supply station 112 also serves as a cooling station within the blow molding machine for bottles 2. Bottles 2 must be cooled prior to the trimming of flash. If the bottles 2 are too hot, the flash deforms rather than cutting cleanly.

Located to the side of label supply station 112 opposite calibration station 110 is a deflashing station 114. Flash is trimmed from the tops and bottoms of bottles 2 by trimming elements 118 in conventional fashion, the trimming elements converging above and below arms 70.

OPERATION

Label transferring device 1b simultaneously places labels in both sides of mold cavities 18 and removes the bottles formed in the previous blow molding cycle from the calibration station. At the start of a cycle, arms 70 are withdrawn from between mold sections 16 as shown in FIG. 5. Arms 70 have just separated, releasing bottles 2 from the previous cycles of the blow molding machine. Placement cylinders 42b are activated in order to extend piston rods 44b and vacuum heads 46b toward label magazines 60. Vacuum heads 46b contact a new set of labels 64 and after a timed duration are retracted, removing labels 64 which are held on heads 46b by the continuous vacuum.

After mold sections 16 have separated leaving a pair of bottles 2 suspended from blow pins 122, FIG. 8, arms 70 are extended between mold sections 16 as shown in FIG. 6. Placement cylinders 42b are then extended to place labels 64 on label mounting surfaces 19. After a timed duration, placement cylinders 44b retract. The greater vacuum applied by vacuum apertures 20 causes labels 64 to adhere in proper registry to mounting surfaces 19.

When limit switches 50b sense the full retraction of piston rods 44b, clamping arms 70 are converged on rods 92 and clamps 76 seize the bottles 2. Clamps 78 and 80 simultaneously clamp the bottles which resulted from the previous two molding cycles. Clamp arms 70 are withdrawn from between mold sections 16 and clamp arms 70 separate, releasing bottles 2.

While the mold sections 16 close about the parisons to form a new set of bottles, the bottles 2 at label supply station 112 cool in preparation for deflashing. Simultaneously, placement cylinders 42b are activated to pick up another set of labels 64 for the next cycle. Flash trimming elements 118 trim the flash from the bottles 2 at deflashing station 114, and conveyor 120 conveys the bottles 2 placed on it away from the blow molding machine.

It will be understood by those skilled in the art that label transferring device 1b may be used to transfer bottles 2 to other operational stations as well as those listed above. Also, clamping arms 70 could be separated in order to shift vacuum heads 46b toward label magazines 60 and label mounting surfaces 19, so that vacuum heads 46b could be fixedly mounted on clamping arms 70. Other label supplies could be used, such as continuous rolls of label strips, instead of the stacked label magazines 60 which urge the labels toward the open end 62.

It is to be understood that the above is merely a description of the preferred embodiment, and that various modifications or improvements, such as the use of pneumatic and/or hydraulic cylinders, can be made without departing from the spirit of the invention disclosed therein. The scope of the protection provided is to be defined by the claims which follow and the breadth of interpretation which the law allows.

The embodiments of the invention in which an exclusive property or privilege is claimed are defined as follows:

1. A blow molding machine having a pair of opposed mold platens mounted on horizontally extending tie rods for movement horizontally toward and away from each other, each platen mounting a mold half thereon, each mold half having at least one cavity which mates with a cavity on the opposed mold half when the mold halves close against each other meeting along a meeting plane, thereby forming the shape of the object to be molded, said blow molding machine effecting blowing of a container at a same certain station during every cycle of its operation, a main rod, a mounting structure spaced outwardly generally horizontally from the platens, generally along said meeting plane, mounting means for mounting the main rod onto the mounting structure, said main rod being supported solely at said mounting structure and extending generally horizontally toward the platens at said certain station, along said meeting plane, cantilevered out from the mounting structure, said rod being extendible and retractable outwardly relative to said mounting structure, along a straight line between an extended position and a retracted position, and being cantilevered at both of said positions, a label magazine positioned adjacent the blow mold platen and including means for supporting a pack of labels in a stack to be picked from the stack horizontally, one at a time, the stack extending horizontally in a direction parallel to the line of movement of the platens, a label carrying head mounted on the end of the main rod opposite from said mounting means, said label carrying head including at least one applicator rod extendible and retractable along a straight line which is perpendicular to the straight line of movement of the main rod, said applicator rod including a vacuum head on the end of said applicator rod, and means for selectively applying vacuum to the vacuum head to selectively hold and release a label, said label carrying head being located between the mold cavities at said certain station of the blow mold with the vacuum head facing the interior of one of the opposed mold cavities when the main rod is in its extended position, and the label carrying head being located adjacent the label magazine in the retracted position of the main rod, both said positions being located outwardly from the cantilever mounting means with the carrying head thereon cantilevered at both of said extended and retracted positions, and with the main rod in the retracted position, the space at the certain station and occupied by the mold halves in the open or closed positions is completely free of said main rod and structures associated therewith, allowing the mold halves to exist in a closed condition at the same location at which the labels were applied, to form a container at that location with the labels applied to that container.

2. The invention of claim 1, said main rod being a piston rod of a fluid operated piston and cylinder.

3. The invention of claim 1, said applicator rod being the rod of a fluid operated piston and cylinder unit.

4. The invention of claim 1, said mold halves forming a pair of opposed cavities, said label carrying head including a separate applicator rod and vacuum head for each of said mold cavities, and incluidng a pair of said label magazines.

5. The invention of claim 1, including a pair of said label magazines located one on each side of the main rod and aligned with each other, each facing toward the main rod, said label carrying head comprising a pair of applicator rods, which rods face in opposite directions along a common straight line, each of said applicator rods being extendable and retractable concurrently along said common straight line which is perpendicular to the straight line of movement of the main rod, each of said applicator rods including a vacuum head located at the outer end thereof.

6. The invention of claim 4, each of said applicator rods being the rod of a fluid operated piston and cylinder unit.

* * * * *